(12) United States Patent
Thubert et al.

(10) Patent No.: US 7,924,722 B2
(45) Date of Patent: *Apr. 12, 2011

(54) FORWARDING PACKETS TO A DIRECTED ACYCLIC GRAPH DESTINATION USING LINK SELECTION BASED ON RECEIVED LINK METRICS

(75) Inventors: Pascal Thubert, La Colle sur Loup (FR); Francois Laurent Le Faucheur, Valbonne (FR); Eric M. Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/751,841

(22) Filed: Mar. 31, 2010

(65) Prior Publication Data

US 2010/0188979 A1 Jul. 29, 2010

Related U.S. Application Data

(63) Continuation of application No. 11/255,966, filed on Oct. 24, 2005, now Pat. No. 7,693,064.

(51) Int. Cl.
*G01R 31/08* (2006.01)
(52) U.S. Cl. .................................. 370/235; 370/252
(58) Field of Classification Search ................ None
See application file for complete search history.

(56) References Cited

U.S. PATENT DOCUMENTS

| | | | |
|---|---|---|---|
| 5,251,205 A | 10/1993 | Callon et al. | |
| 5,519,704 A | 5/1996 | Farinacci et al. | |
| 5,881,246 A | 3/1999 | Crawley et al. | |
| 6,865,184 B2 | 3/2005 | Thubert et al. | |
| 7,006,453 B1 | 2/2006 | Ahmed | |
| 7,333,827 B2 | 2/2008 | Biddiscombe et al. | |
| 7,693,064 B2 | 4/2010 | Thubert et al. | |
| 2002/0141346 A1 | 10/2002 | Garcia-Luna-Aceves et al. | |
| 2003/0202465 A1 | 10/2003 | Cain | |
| 2004/0032852 A1 | 2/2004 | Thubert et al. | |
| 2004/0081152 A1 | 4/2004 | Thubert et al. | |

(Continued)

FOREIGN PATENT DOCUMENTS

EP 1 324 532 A2 7/2003

(Continued)

OTHER PUBLICATIONS

U.S. Appl. No. 11/251,760, filed Oct. 18, 2005, Thubert et al.

(Continued)

*Primary Examiner* — Kwang B Yao
*Assistant Examiner* — Tung Q Tran
(74) *Attorney, Agent, or Firm* — Leon R. Turkevich

(57) ABSTRACT

Each network node having at least one destination-oriented link toward a directed acyclic graph (DAG) destination can receive a corresponding set of path performance metrics via the destination-oriented link. The set of path performance metrics, initiated by the DAG destination outputting initial link metrics on each of its source-connecting links, identifies aggregate link metrics for a corresponding path to the DAG destination via the corresponding destination-oriented link. The network node outputs a corresponding updated set of path performance metrics on each of its source-connecting links based on the received set of path performance metrics and the corresponding link metric for the corresponding source-connecting link. Hence, each network node in the DAG can assess the performance of each connected path to the DAG destination, and forward a data packet via a selected destination-oriented link based on the corresponding path performance metrics and forwarding policies for the forwarded data packet.

20 Claims, 4 Drawing Sheets

U.S. PATENT DOCUMENTS

| | | | |
|---|---|---|---|
| 2005/0265259 | A1 | 12/2005 | Thubert et al. |
| 2006/0010249 | A1 | 1/2006 | Sabesan et al. |
| 2006/0067247 | A1 | 3/2006 | Rajan |
| 2006/0101157 | A1 | 5/2006 | Eardley |
| 2006/0133328 | A1 | 6/2006 | Levendel et al. |
| 2006/0227724 | A1 | 10/2006 | Thubert et al. |
| 2006/0291404 | A1 | 12/2006 | Thubert et al. |
| 2006/0291485 | A1 | 12/2006 | Thubert et al. |

FOREIGN PATENT DOCUMENTS

| | | |
|---|---|---|
| WO | WO 2005/010214 A2 | 2/2005 |

OTHER PUBLICATIONS

Baker, "An outsider's view of MANET" <draft-baker-manet-review-01> Network Working Group, Internet Draft, Mar. 17, 2002, pp. 1-39.

Ernst et al., "Network Mobility Support Terminology" >draft-ernst-monet-terminology-01.txt> IETF Internet Draft, Jul. 2002, pp. 1-18.

Kandula et al., "Walking the Tightrope: Responsive Yet Stable Traffic Engineering", Association for Computing Machinery (ACM), SIGCOMM '05, Aug. 21-26, 2005, Philadelphia, Pennsylvania, ACM 1-59593-009-04/05/08, 12 pages.

Moy, :OSPF Version 2, Network Working Group, Request for Comments: 2328, Apr. 1998, pp. 1-244.

Awduche et al., "RSVP-TE: Extensions to RSVP for LSP Tunnels", Network Working Group, Request for Comments: 3209, Dec. 2001, pp. 1-61.

Le Roux et al., "Requirements for Inter-Area MPLS Traffic Engineering", Network Working Group, Request for Comments: 4105, Jun. 2005, pp. 1-22.

Badache et al., "Le routage dans les réseaux mobiles ad hoc", Ministère De L'Enseignement Supérieur Et De La Recherche Scientifique, Sep. 2000, <http://opera/inrialpes.fr/people/Tayeb.Lemlouma/Papers/AdHocRouting.pdf>, 115 pages.

Perkins et al., "Ad hoc On-Demand Distance Vector (AODV) Routing" <draft-ietf-manet-aodv-13.txt> Mobile Ad Hoc Networking Working Group Internet Draft, Feb. 17, 2003, pp. i-ii and 1-35.

Johnson et al., "The Dynamic Source Routing Protocol" <draft-ietf-manet-dsr-09.txt> IETF MANET Working Group Internet Draft, Apr. 15, 2003, pp. i-v and 1-111.

Garcia-Luna-Aceves et al, "Source Tree Adaptive Routing (STAR) Protocol" <draft-ietf-manet-star-00.txt> IETF MANET Working Group Internet Draft, Oct. 22, 1999, pp. 1-26.

Park et al., "A Highly Adaptive Distributed Routing Algorithm for Mobile Wireless Networks", Proceedings of IEEE INFOCOM '97, (1997), 9 pages.

Park et al., "A Highly Adaptive Distributed Routing Algorithm for Mobile Wireless Networks", Proceedings of IEEE INFOCOM '97, (1997) (Powerpoint Presentation by Xin Zhang), 12 pages.

Thubert et al. "Nested Nemo Tree Discovery" <draft-thubert-tree-discovery-01.txt> NEMO Working group Internet Draft, Oct. 11, 2004, pp. 1-17.

Perkins, ed., *Ad Hoc Networking*, 2001, Chapter 8—Link Reversal Routing, Addison-Wesley, USA, title pages (2) and pp. 255-298.

FORWARDING PACKETS TO A DIRECTED ACYCLIC GRAPH DESTINATION USING LINK SELECTION BASED ON RECEIVED LINK METRICS

This application is a continuation of commonly-assigned, copending application Ser. No. 11/255,966, filed Oct. 24, 2005.

BACKGROUND OF THE INVENTION

1. Field of the Invention

The present invention relates to creation of a network topology according to a directed acyclic graph for establishment of an ad hoc mobile network by mobile routers, and distribution of network traffic to a destination of the directed acyclic graph based on selecting from among multiple available paths in the directed acyclic graph.

2. Description of the Related Art

Proposals have been made by Internet Engineering Task Force (IETF) groups for improved mobility support of Internet Protocol (IP) based mobile devices (e.g., laptops, IP phones, personal digital assistants, etc.) in an effort to provide continuous Internet Protocol (IP) based connectivity. The IETF has a Mobile IP Working Group that has developed routing support to permit IP nodes (hosts and routers) using either IPv4 or IPv6 to seamlessly "roam" among IP subnetworks. In addition, the Mobile Networks (MONET) group (renamed as the Network Mobility (NEMO) group) has published different Internet Drafts, including an Internet Draft by Thierry Ernst, entitled "Network Mobility Support Terminology", February 2002. An objective of NEMO is providing mobile nodes with protocols for establishing connectivity with a wide area network, such as the Internet. Thus, mobile routers have been used to establish a mobile network topology in order to route packets between the mobile network and the Internet via a gateway at an edge of the mobile network. However, such a mobile network topology typically requires an aggregate reachability to IP nodes, where all nodes sharing a common network link (such as a link of a top level mobile router connecting to an attachment router on the Internet) share the same routing prefix. Such aggregation creates a hierarchy of network prefixes that enables scalability. However, such a hierarchy is not possible in ad hoc networks.

The IETF has a Mobile Ad-hoc Networks (MANET) Working Group that is working to develop standardized MANET routing specification(s) for adoption by the IETF. According to the MANET Working Group, the "mobile ad hoc network" (MANET) is an autonomous system of mobile routers (and associated hosts) connected by wireless links—the union of which form an arbitrary graph. The routers are free to move randomly and organize themselves arbitrarily; thus, the network's wireless topology may change rapidly and unpredictably. Such a network may operate in a standalone fashion, or may be connected to the larger Internet.

The MANET system is particularly suited to low-power radio networks that may exhibit an unstable topology, where wireless propagation characteristics and signal quality between a wireless transmission source and a receiver can be difficult to model and quantify. In a MANET, the device address is tied to the device, not a topological location, as there is no fixed network infrastructure. When the addressed device moves, therefore, the motion changes the routing infrastructure. Hence, as described in an Internet Draft by Baker, entitled "An Outsider's View of MANET" (Mar. 17, 2002), the fundamental behavior of a MANET is that a routing node carries with it an address or address prefix, and when it moves, it moves the actual address; when this happens, routing must be recalculated in accordance with the new topology. For example, each mobile router retains its address prefix; hence, neighboring mobile routers in a MANET may have distinct address prefixes.

FIG. 1 is a diagram illustrating a conventional layer 2 mesh network 10 having multiple mobile routers (N0, N1, N2, N3, N4) interconnected by links (A, B, C, D, E, F, G) having respective metrics (i.e., costs). The presence of layer 2 links (A, B, C, D, E, F, G), however, does not provide a routing topology that enables any given mobile router to reach a destination mobile router. Hence, a routing protocol such as Open Shortest Path First (OSPF) (as specified by the IETF Request for Comments (RFC) 2178) has been needed in order for each mobile router (e.g., N0) to determine a path to a given destination (e.g., N11).

Communications between mobile routers of an ad hoc network can be optimized based on the mobile routes organizing into a tree-based topology. For example, U.S. Patent Publication No. US 2004/0032852, published Feb. 19, 2004, entitled "Arrangement for Router Attachments Between Roaming Mobile Routers in a Mobile Network", the disclosure of which is incorporated in its entirety herein by reference, describes a technique for each mobile router of an ad hoc mobile network to independently select whether to attach to a candidate attachment router, based on tree information options advertised by the candidate attachment router and selection criteria employed by the mobile router. The independent selection by each router of whether to attach to another router enables the routers to dynamically establish a tree-based network topology model, where each router may continually determine whether an alternate attachment point within the tree is preferred.

Link reversal routing has been suggested as a technique for providing multiple communications links between nodes in an ad hoc mobile network, where link reversal routing algorithms build a directed acyclic graph (DAG) for each possible destination: a directed graph is acyclic if it contains no cycle or loop, and the DAG maps to a given destination based on the destination having only incoming links: all other nodes that have incoming links also must have outgoing links. An example of a routing algorithm that builds a DAG is the Temporally-Ordered Routing Algorithm (TORA).

Commonly-assigned, copending application Ser. No. 11/167,240, filed Jun. 28, 2005, entitled "Directed Acyclic Graph Discovery and Network Prefix Information Distribution Relative to a Clusterhead in an Ad Hoc Mobile Network", published Dec. 28, 2006 as U.S. Patent Publication No. 2006/0291404 (the disclosure of which is incorporated in its entirety herein by reference), describes one technique for creating a directed acyclic graph, where each mobile router in an ad hoc mobile network is configured for concurrently attaching to multiple parents advertising respective parent depths relative to a clusterhead of the ad hoc mobile network. The mobile router selects an advertised depth relative to the clusterhead based on adding a prescribed increment to a maximum one of the parent depths, enabling the mobile routers to form a directed acyclic graph relative to the clusterhead. Each mobile router sends to each of its parents a neighbor advertisement message specifying information that enables the parents to reach at least one reachable prefix relative to stored router entries.

Another example of a directed acyclic graph creation in an ad hoc network is described in commonly-assigned, copending application Ser. No. 11/251,765, filed Oct. 18, 2005, entitled "Directed Acyclic Graph Computation by Orienting Shortest Path Links and Alternate Path Links Obtained from Shortest Path Computation", published Apr. 19, 2007 as U.S. Patent Publication No. 2007/0086358, the disclosure of which is incorporated in its entirety by reference. The network node performs a modified shortest path first calculation by identifying next-hop nodes adjacent to the network node, and orienting the link of each next-hop node toward itself (i.e., the origin). The network node also identifies secondary adjacent nodes, adjacent to each of the next hop nodes, and extends paths from next-hop nodes to the associated secondary adjacent nodes while orienting each of the links of the path between adjacent nodes and next-hop nodes toward the next hop nodes. The paths of the nodes form a directed acyclic graph from any other network node toward the origin, enabling distribution of the directed acyclic graph to the other network nodes for optimized reachability to the network node.

Although the foregoing description demonstrates that directed acyclic graphs can be readily created within an ad hoc network, a typical implementation would result in full utilization of the shortest path toward a DAG destination, with no utilization of any other path in the DAG until the shortest path was no longer available. Efforts to improve the performance of link state routing computations, also referred to Shortest Path First (SPF) based computations, based on using dynamic routing metrics instead of static metrics previously resulted in network instability. For example, in OSPF a router floods the network with link state advertisements (LSAs) advertising the assigned costs of the respective links utilized by the router, enabling other routers to calculate shortest routes to destinations. Use of dynamic routing metrics (e.g., early attempts at using dynamic routing metrics (e.g., in ARPANET)) were unsuccessful because the dynamic routing metrics tended to introduce instabilities due to oscillation in the link delay values: routers receiving an advertisement of a dynamic routing metric (e.g., a low link delay value in a delay-based routing protocol) would immediately reconfigure their routes to use the advertised low delay link, creating substantially higher traffic on the advertised link; routers would then reroute their paths around the advertised link that had become a high delay link, causing the router to advertise the advertised link again as a low delay link. Such oscillation in the dynamic routing metrics caused routing instability.

Load balancing technology has been implemented in conventional Internet Protocol based networks that have an established addressing hierarchy. For example Enhanced Interior Gateway Routing Protocol (EIGRP) (described in U.S. Pat. No. 5,519,704 and incorporated in its entirety herein by reference) permits unequal-cost load balancing. However, EIGRP is a distance vector-based routing protocol and therefore incompatible with OSPF-based routing protocols, and therefore cannot be used in networks that rely on directed acylic graphs.

Other proposals such as Reservation Protocol with Traffic Engineering (RSVP-TE) according to RFC 3209 require best paths to be regularly recomputed using Constrained Shortest Path First (CSPF) (RFC 4105), which causes a loss of routing capabilities until the new best paths have been established. In addition, such proposals require source-route capabilities, which introduces the necessity of maintaining path states throughout a path in the network.

SUMMARY OF THE INVENTION

There is a need for an arrangement that optimizes utilization of all available paths in a directed acyclic graph (DAG) toward a DAG destination, without the necessity of route recalculation that would require recalculation of the DAG.

There also is a need for an arrangement that enables each network node in a path toward a DAG destination to determine how network traffic should be distributed among multiple next-hop links toward a DAG destination.

There also is a need for an arrangement that optimizes utilization of all available paths in a directed acyclic graph (DAG) toward a DAG destination, without the necessity of maintaining state information for a given path.

These and other needs are attained by the present invention, where each network node having at least one destination-oriented link toward a directed acyclic graph (DAG) destination is configured for receiving a corresponding set of path performance metrics via the at least one destination-oriented link. The set of path performance metrics, initiated by the DAG destination outputting initial link metrics on each of its source-connecting links, identifies aggregate link metrics for a corresponding path to the DAG destination via the corresponding destination-oriented link. The network node outputs a corresponding updated set of path performance metrics on each of its source-connecting links based on the received set of path performance metrics and the corresponding link metric for the corresponding source-connecting link. Hence, each network node in the DAG is able to assess the performance of each connected path toward the DAG destination, and forward a data packet via a selected destination-oriented link based on the corresponding path performance metrics and forwarding policies for the forwarded data packet.

One aspect of the present invention provides a method in a network node. The method includes receiving, via a first destination-oriented link that is directed toward a directed acyclic graph (DAG) destination, a first set of path performance metrics that identifies aggregate link metrics for a corresponding path to the DAG destination via the first destination-oriented link, the path performance metrics based on at least initial link metrics having been output by the DAG destination onto a corresponding source-connecting link, the initial link metrics describing performance of the corresponding source-connecting link. The method also includes selectively determining second link metrics for each second source-connecting link connecting the network node to a corresponding connected network node. The method also includes selectively outputting, onto each second source-connecting link, a corresponding updated set of path performance metrics based on the set of path performance metrics and the corresponding second link metrics, the updated set of path performance metrics identifying the aggregate link metrics for the corresponding path to the DAG destination via the corresponding second source-connecting link and the first destination-oriented link.

The distribution of path performance metrics, identifying the aggregate link metrics for the links establishing a path to the DAG destination, enables each network node to determine the relative aggregate link metrics for each available path toward the DAG destination. Hence, each network node can dynamically select a destination-oriented link for forwarding a data packet to the DAG destination, based on the relative aggregate link metrics.

Consequently, a network node can quickly adapt to changes in network activity, for example a deteriorating condition in an available path due to a corresponding deteriorating condition in a remote destination-oriented link of another network node in the path, while preserving utilization of the existing directed acyclic graph. Further, link layer traffic policies (including bandwidth reservation policies) can be implemented throughout the network based on distribution of the aggregate link metrics based on establishing a forwarding procedure overlying the directed acyclic graph. Hence, network traffic can be rerouted as needed along different paths toward the DAG destination without any modification or recalculation of the directed acyclic graph.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
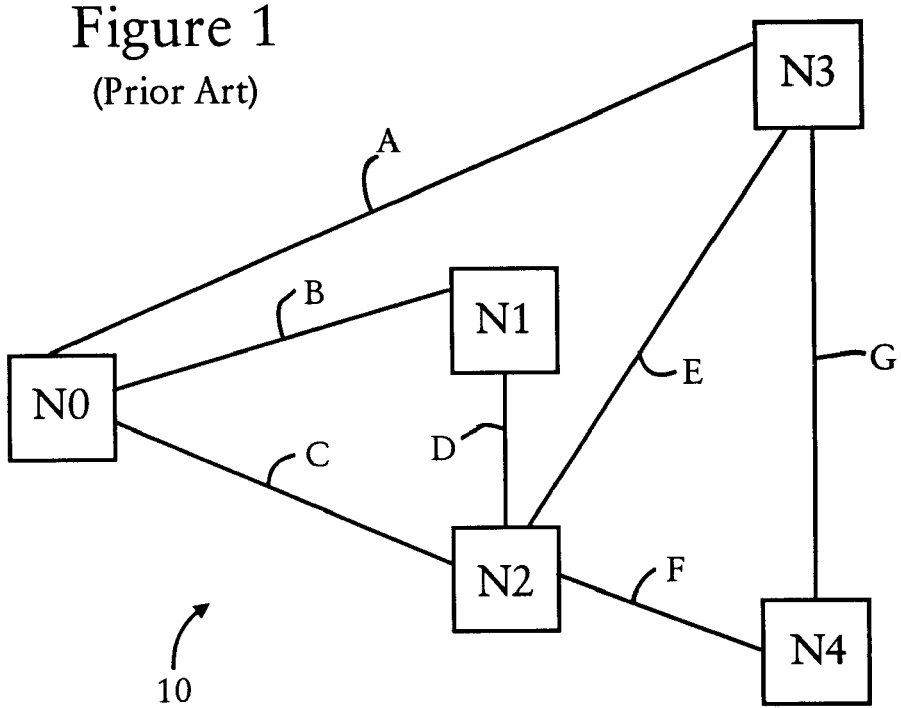
FIG. 1 is a diagram illustrating a conventional (prior art) layer 2 mesh network.
Figure 2:
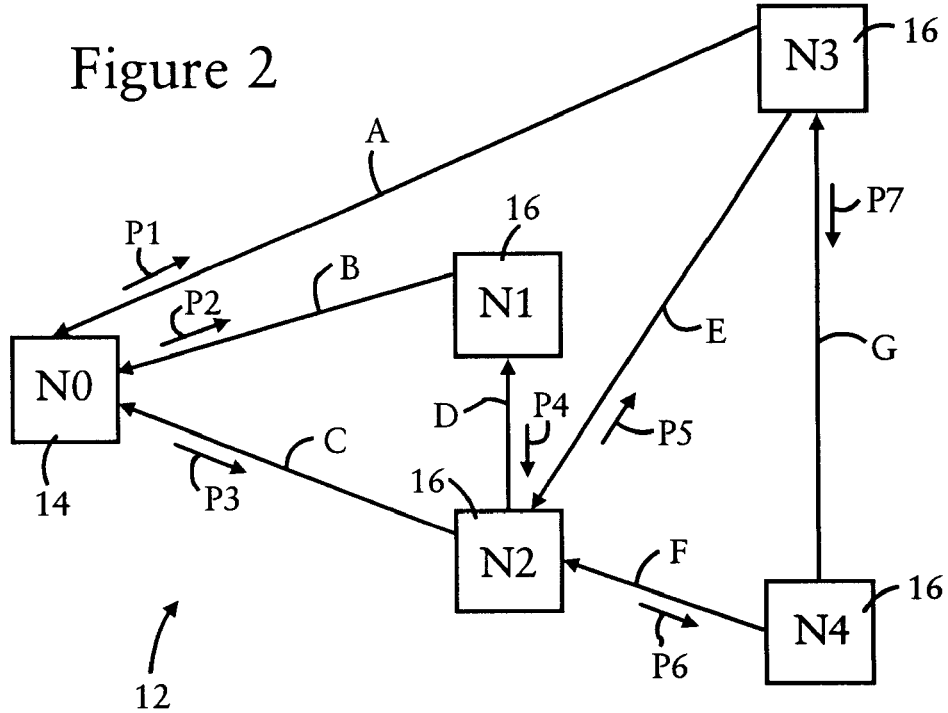
FIG. 2 is a diagram illustrating the network of FIG. 1 having established a directed acyclic graph (DAG) for reaching a DAG destination along selected paths based on distribution of link metrics, according to an embodiment of the present invention.

FIG. 2 is a diagram illustrating the layer 2 mesh network of FIG. 1 having established a directed acyclic graph (DAG) 12 for reaching a DAG destination 14 along selected paths, based on distribution of link metrics, according to an embodiment of the present invention. In particular, the DAG 12 enables any source node 16 to send data to the DAG destination 14 via at least one path. The directed acyclic graph 12, generated by the DAG destination N0 14, also referred to as the "origin", is distributed to each of the other network nodes 16 (N1, N2, N3, and N4), enabling each of the other nodes 16 (N1, N2, N3, and N4) to establish at least one path to the DAG destination N0 based on forwarding data via successive destination-oriented links A, B, C, D, E, F, or G.

The term "destination-oriented link" refers to any link that transmits data from a network node to either the DAG destination 14, or a next-hop node 16 having a corresponding destination-oriented link for transmitting data packets toward the DAG destination 14 via a loop-free path. For example, the network node N2 has a destination-oriented link C for transmitting data packets to the DAG destination 14, and a second destination-oriented link D for transmitting data packets to the DAG destination 14 via the next-hop network node N1; in contrast, the network node N2 has source-connecting links E and F that enable the respective source nodes N3 and N4 to reach the DAG destination 14 via one of the destination-oriented links C or D. Also note that the source-connecting links E and F cannot be used by the network node N2 for reaching the DAG destination 14 (N0), as the structure of the DAG 12 requires that data traffic destined for the DAG destination 14 travel in the indicated direction (i.e., link E is used to transmit data only from network node N3 to N2 and link F is used to transmit data only from the network node N4 to N2). Hence, the single destination-oriented link B of the network node N1 is the only available link for the network node N1 to transmit data packets to the DAG destination 14, as the link D is a source-connecting link for the network node N1.

As described above, the establishment of destination-oriented links and source-connecting links between the network nodes establishing the DAG 12 guarantees that any data packets from any of the source nodes 16 will reach the DAG destination 14, assuming the packet is not dropped. For example, the network node N4 is able to reach the DAG destination 14 via five distinct paths: the first path is formed by the destination-oriented links F-C; the second path is formed by the destination-oriented links F-D-B; the third path is formed by the destination-oriented links G-E-C; the fourth path is formed by the destination-oriented links G-E-D-B; and the fifth path is formed by the destination-oriented links G-A. Hence, the DAG 12 guarantees that any packet output by the network node N4, or any other node N3, N2, or N1 will invariably reach the DAG destination 14, unless for some reason the packet is dropped.

As described previously, there is a need for an arrangement that optimizes utilization of all available paths in the DAG 12 toward the DAG destination 14, without the necessity of route recalculation that would require recalculation of the DAG 12. For example, it would be highly desirable for the network node N4 to be able to select one of the available destination-oriented links F or G on a per-packet basis, in order to implement traffic policies such as load-balancing, bandwidth reservation according to prescribed protocols such as resource reservation protocol, etc.

According to the disclosed embodiment, the directed acyclic graph 12 is generated by the origin 14 based on topological metrics that are used to establish a network topology within a network. In particular, topological metrics refer to network parameters that are static, or that change only infrequently, for example access router identifier, service provider identifier, link speed, link bandwidth, and other parameters that may be manually configured by network administrators. Such topological metrics typically have a correlation between their values and a corresponding cost of utilizing the associated link that connects network nodes.

Consequently, topological metrics are used by the origin 14 in order to create the DAG 12, which can then be distributed to the other nodes 16 in order to enable the other nodes 16 to reach the origin 14 via multiple available paths. As apparent from the foregoing, each network node N0, N1, N2, N3, N4 will create its own directed acyclic graph towards itself, and distribute the corresponding directed acyclic graph to the other nodes. Hence, each of the nodes have, for each other node in the network 10, a corresponding DAG 12 for reaching the corresponding DAG destination 14.

Following establishment of the DAG 12, each of the network nodes also establishes a forwarding protocol that enables network traffic to the DAG destination 14 to be balanced across the available destination-oriented links, without modifying the structure of the DAG 12. Further, the periodic distribution (i.e., cascading) of path performance metrics P1, P2, P3, P4, P5, P6 and P7 initiated by the DAG destination 14 enables each of the other network nodes 16 to adapt their respective forwarding protocols based on the detected path performance metrics P1, P2, P3, P4, P5, P6 and P7, without any modification to the underlying DAG 12.

As described in further detail below, the DAG destination 14 initially outputs, on each of its source-connecting links A, B, and C, a corresponding set of initial link metrics P1, P2, and P3 that describe dynamic metrics (i.e., metrics that vary based on network traffic, resource reservation requests, etc.) for the corresponding source-connecting links A, B, and C. The next-hop nodes N3, N1, and N2, in response to receiving the initial link metrics P1, P2, and P3 via their respective destination-oriented links A, B, and C, store the initial link metrics internally; each of the next-hop nodes N3, N1, and N2 also determine the associated link metrics for each of their source-connecting links (e.g., G for N3, D for N1, and links E and F for N2) and output a corresponding updated set of path performance metrics (P7 by N3 onto G; P4 by N1 onto D; and P5 onto E and P6 onto F by N2) that identify the aggregate link metrics for the corresponding path to the DAG destination 14 via the corresponding source-connecting link and destination-oriented link. Each link metric includes a DAG origin identifier that identifies the DAG destination 14, and a sequence number that uniquely identifies the link metric. Identification of the DAG destination 14 (N0) by the DAG origin identifier enables a network node 16 to identify that a received link metric is associated with a link metric propagation that has been initiated by the DAG destination 14 (N0), and therefore is relevant to the DAG 12 oriented toward the DAG destination 14 (N0). In addition, the sequence number enables any node to determine whether the received link metric associated with the DAG 12 oriented toward the DAG destination 14 (N0) is the most recent metric relative to prior received metrics.

Hence, each network node 16 can obtain precise metrics with respect to available paths for reaching a specific destination, namely the DAG destination 14. The precise metrics for the available paths to the destination enables each network node to assess traffic distribution throughout the DAG 12 for reaching the DAG destination 14, and perform destination-oriented link selection in order to evenly distribute network traffic throughout the DAG 12.

Consequently, network traffic can be balanced to the extent that each and every path can reach saturation before the need for dropping any packet; further, such dynamic forwarding protocols enable the network throughput to be improved, since at least some of traffic can be dynamically rerouted via a less congested loop less path. Hence, the establishment of a forwarding protocol overlying the DAG 12, having been created according to a prescribed routing protocol, enables implementation of a graph-level out-of-band flow control resource that influences forwarding decisions in order to reroute traffic overflow, and which tends to restore initial settings upon normal network conditions.

Figure 3:
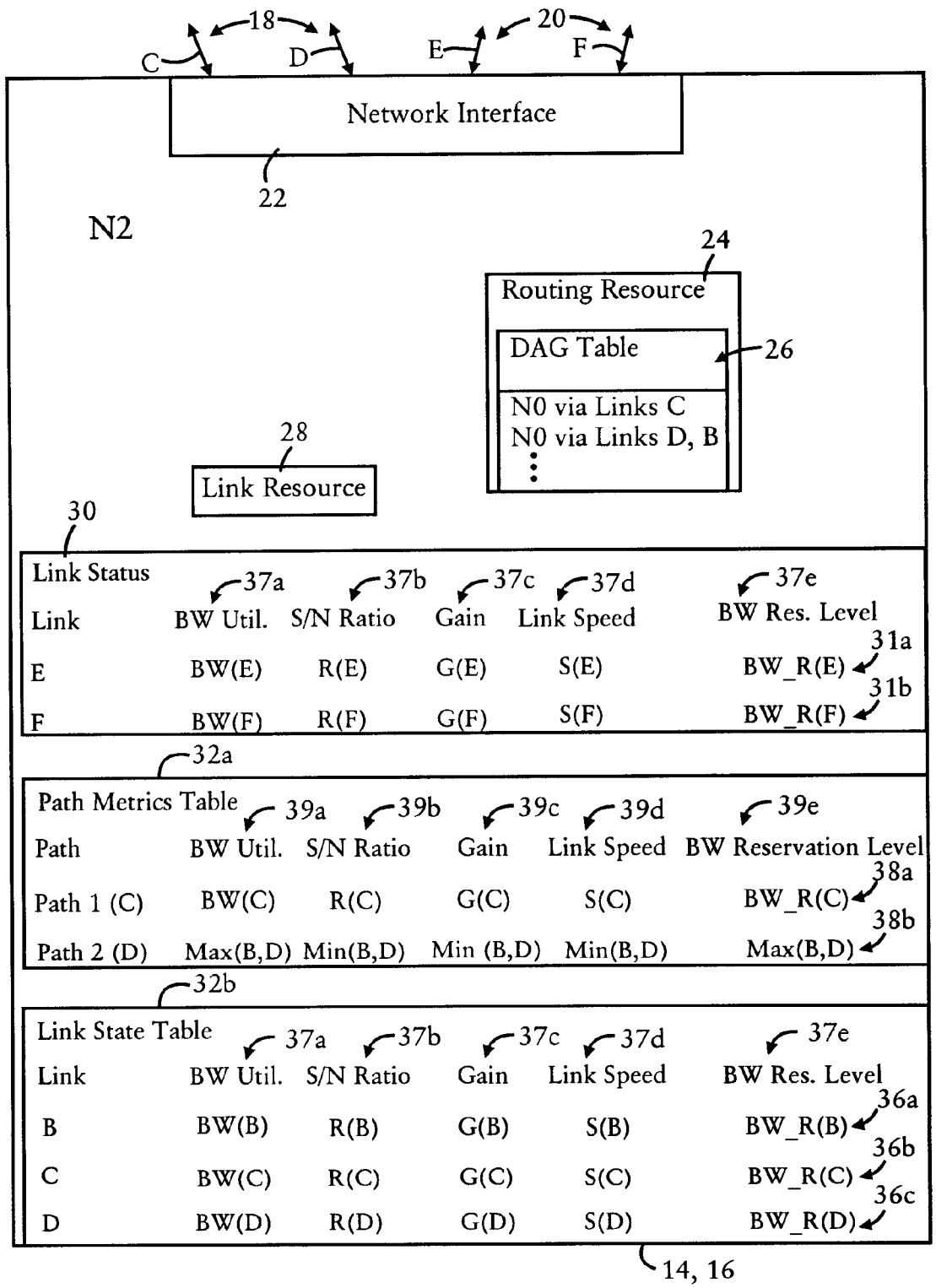
FIG. 3 is a diagram illustrating one of the network nodes of FIG. 2, according to an embodiment of the present invention.

FIG. 3 is a diagram illustrating one of the network nodes 14 or 16 of FIG. 2, according to an embodiment of the present invention. For ease of illustration, FIG. 3 illustrates the network node N2 having the destination-oriented links 18 (C and D) and the source-connecting links 20 (E and F). The network node 16 of FIG. 3 includes a network interface 22, a routing resource 24 configured for generating its own DAG 12 (i.e., where the node N2 establishes itself as the DAG destination) based on topological metrics, and a DAG table 26 configured for storing the DAG 12 for each of the other network nodes as respective DAG destinations (e.g., the DAG 12 of FIG. 2). The node 16 also includes an executable link resource 28, a link status table 30, and a means 32a and/or 32b for storing the path performance metrics for each of the paths reachable by a corresponding destination-oriented link 18. As described below, the means for storing the path performance metrics for each path toward the DAG destination 14 may be implemented either as a path metrics table 32a or a link state table 32b.

The network interface 22 is configured for receiving, via the destination-oriented links 18, path performance metrics that identify aggregate link metrics for each path to the DAG destination 14. For example, FIG. 2 illustrates that the network interface 22 receives, via the destination-oriented link C, a first set of path performance metrics P3 that identifies the aggregate link metrics for the corresponding path (via link C) to the DAG destination 14 via the destination-oriented link C having supplied the path performance metrics; in this case, the path performance metrics P3 simply specify the initial link metrics for the link C having been output by the DAG destination 14 P3. FIG. 2 also illustrates that the network interface 22 receives, via the second destination-oriented link D, a second set of path performance metrics P4 that identifies the aggregate link metrics for the corresponding path (via links D-B) to the DAG destination 14 via the second destination-oriented link D having supplied the path performance metrics P4.

Each of the path performance metrics (e.g., P3, P4) received by the network interface 22 identifies aggregate link metrics for a corresponding path (e.g., via link C, or via links D-B) to the DAG destination 14 via the corresponding destination-oriented link. The path performance metrics (e.g., P3 or P4) may be implemented either as a collection of individual link metrics for each hop in the corresponding path between the DAG destination 14 and the network node having received the path performance metrics, or a single message that specifies the aggregate link metrics for the links along the corresponding path.

Figure 4A:
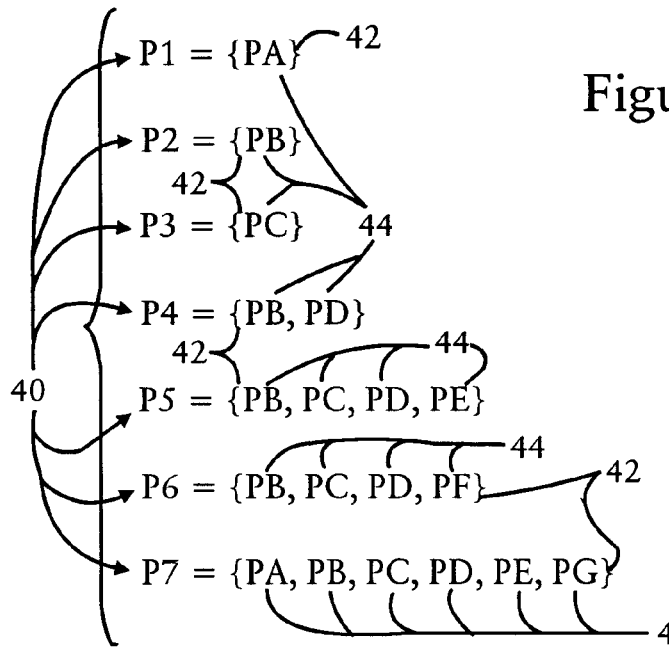
FIGS. 4A and 4B are diagrams illustrating alternative implementations of the path performance metrics as a collected set of link metrics for each hop in a path, and a set of accumulated link metrics for each path, respectively.
Figure 4B:
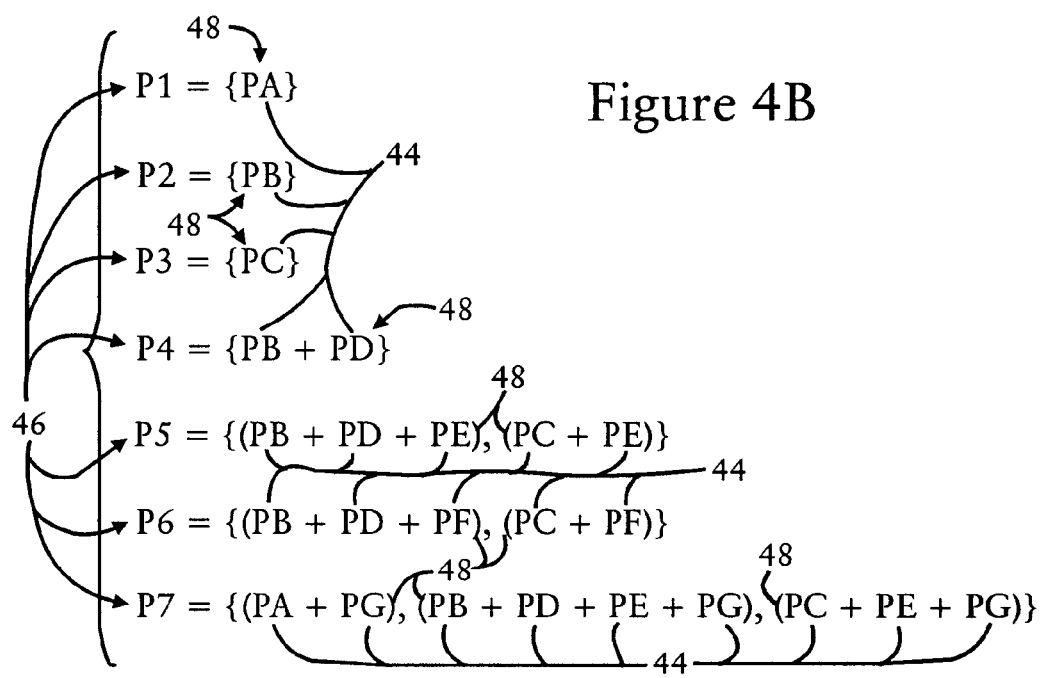

FIGS. 4A and 4B are diagrams illustrating alternative exemplary implementations of the path performance metrics as distributed throughout the DAG 12. FIG. 4A illustrates a link state type of path performance metrics, where each path performance metric 40 is composed of a corresponding collection 42 of individual link metrics 44: each individual link metric 44 specifies the link metrics for a specific link (e.g., link C), such that a network node 16 receives the metrics for each link for each hop to the DAG destination 14. In particular, each individual link metric 44 (e.g., PC) specifies a link identifier specifying the specific link being measured (e.g., C), the DAG origin identifier (identifying that the link metric 44 is relevant to the DAG 12 oriented toward the DAG destination 14 (N0), and the sequence number. The network interface 22 may receive the collection 42 of individual link metrics 44 as a plurality of individual messages having the same DAG origin identifier and sequence number and respective link identifiers, where the individual link metrics 44 for a given collection 42 may need to be received within a prescribed timer interval.

As described below, each network node 16, in response to receiving a collection 42 of individual link metrics 44 that form a path performance metric 40, updates the collection of path performance metrics by outputting onto each source-connecting link the received collection 42 of individual link metrics 44, and also outputting its own corresponding link metrics for each source-connecting link. For example, in response to receiving via link C the path performance metrics P3 (consisting of the individual link metric PC 44 for link C) and the individual link metrics PB and PD 44 that form the path performance metrics P4, the link resource 28 will store the received metrics in the table 32b and determine the link metrics (e.g., PE, PF) for each source-connecting link (e.g., link E, link F) as stored as entries 31a, 31b in the link status table 30 of FIG. 3; the link resource 28 outputs onto the source-connecting link E the individual link metrics PB, PC, PD, and PE (which constitute the path performance metric P5 40), each specifying the same DAG origin identifier and the same sequence number as received via links C and D. The link resource 28 also outputs onto the source-connecting link F the individual link metrics PB, PC, PD, and PF (which constitute the path performance metric P6 40), each specifying the same DAG origin identifier and the same sequence number as received via links C and D.

Although the above description assumes that the path performance metric 40 is composed of receiving a collection of individual messages each specifying a corresponding link metric 44, where membership in the collection is based at least on DAG origin identifier and sequence number (and possibly also by receipt within a timer window), an alternative implementation for the path performance metric 40 is that the entire collection 42 is sent as a single message containing multiple link metrics 44.

Hence, the link resource 28 stores the received link metrics 44 for each of the path performance metrics 40 in the link state table 32*b*. In particular, the link resource 28 stores each of the link metrics 44, for each hop in the path between the DAG destination 14 and the network node, in the link state table 32*b* in the form of a table entry 36. As illustrated in FIG. 4A the set of path performance metrics P4 is a collection of the link metrics PB and PD generated by the nodes N0 and N1, respectively. Hence, the link resource 28 stores the link metrics PB and PD as entries 36*a* and 36*c*, respectively.

Each entry 36 includes the associated link metrics for the corresponding link, including exemplary parameters such as bandwidth or traffic utilization 37*a*, signal to noise ratio 37*b*, gain 37*c*, link speed 37*d*, and bandwidth reservation level 37*e*. Hence, each set of link metrics 44 specifies the parameters 37*a*-37*e*, enabling the link resource 28 to determine the path performance metrics for paths toward the DAG destination 14 based on parsing the link state table for each of the next-hop links toward the DAG destination 14.

FIG. 4B illustrates an alternative form of path performance metrics, namely a distance vector type of path performance metric, where each path performance metric 46 specifies at least one set of accumulated link metrics 48 for a corresponding path, where each accumulated link metric 48 is composed of the link metrics 44 for at least the initial link metrics for a source-connecting link from the DAG destination 14. For example, the path performance metric P4 specifies the accumulated link metrics 48 describing the corresponding path (D-B) to the DAG destination 14, where the accumulated link metrics 48 are expressed as "PB+PD": note that the plus sign "+" does not represent addition, especially since addition is not performed; rather each of the associated link metrics 37 are accumulated (i.e., cumulatively compared) as appropriate, for example identifying a minimum value for "weakest link" analysis (e.g., worst traffic utilization 39*a* that is most congested, lowest signal to noise ratio 39*b*, lowest gain 339*c*, lowest link speed 39*d*), identifying a maximum value for maximum reserved bandwidth 39*e*, etc.

Hence, FIG. 4B illustrates that the path performance metrics P1, P2, P3, and P4 identify the aggregate link metrics 48 for a single path, whereas the path performance metrics P5 and P6 each identify the aggregate link metrics 48 for two distinct paths to the DAG destination 14, and the path performance metric P7 identifies the aggregate link metrics 48 for three distinct paths to the DAG destination 14.

Referring to FIG. 3, the link resource 28, in response to receiving the path performance metric P3 46, stores in the path metrics table 32*a* a forwarding table entry 38*a* specifying that the DAG destination 14 is reachable via the destination-oriented link C according to the accumulated link metrics 39*a*-39*e*: since the path performance metric P3 46 is output by the DAG destination 14 as the initial link metric describing the performance of its corresponding source-connecting link P3, the entry 38*a* of the node N2 specifies simply the initial link state metrics for its destination-oriented link C. In contrast, the link resource 28 responds to receipt of the path performance metric P4 46 by storing in the path metrics table 32*a* a forwarding table entry 38*b* that specifies that the DAG destination 14 is reachable via the destination-oriented link D according to the accumulated link metrics 39*a*-39*e*. As described previously, the accumulated link metrics may be expressed as minimum values, maximum values, accumulated values, or moving averages (e.g., average value per hop), as appropriate.

Figure 5:
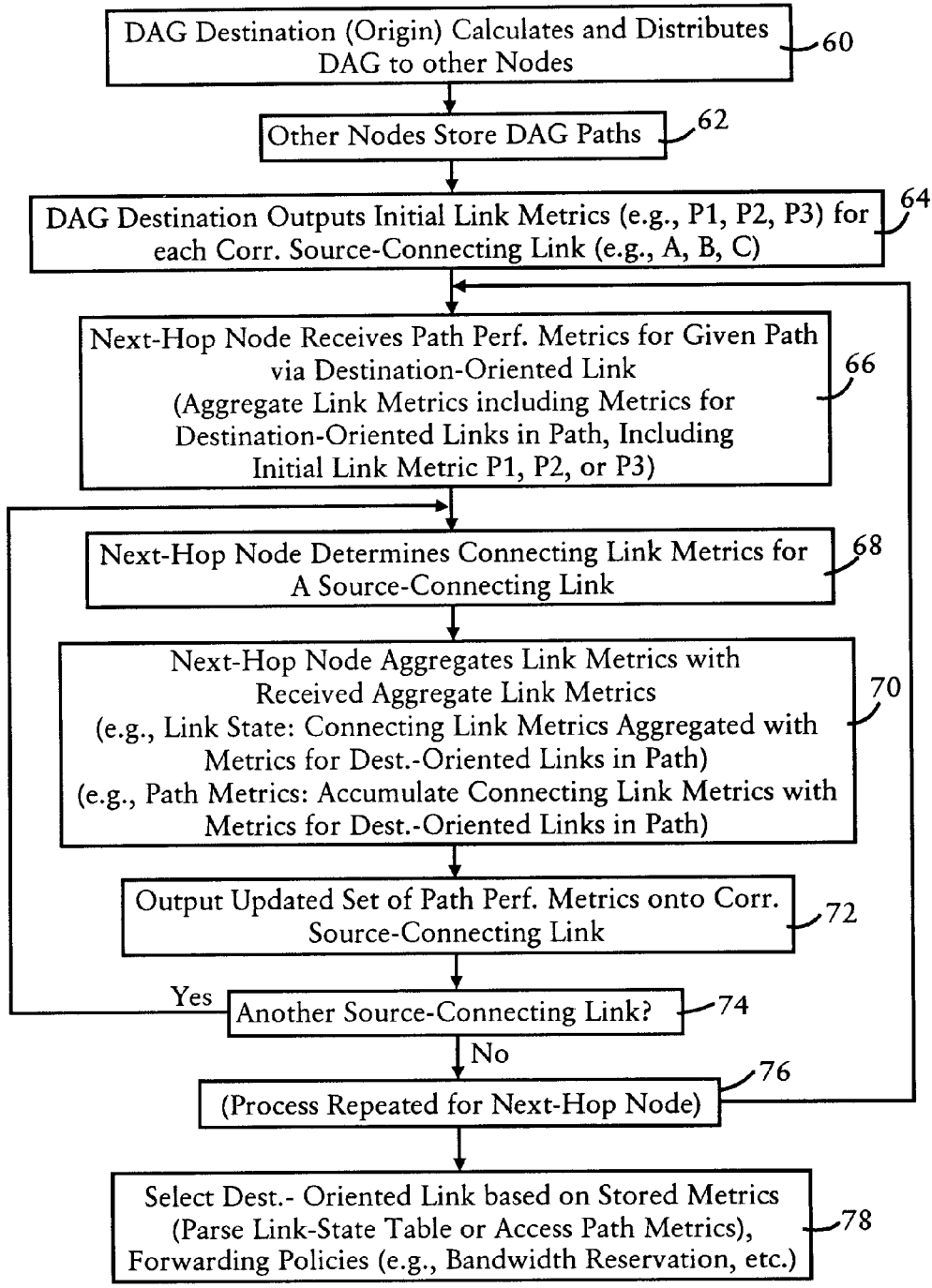
FIG. 5 is a diagram illustrating the method in the network of FIG. 2, and in each of the mobile nodes of FIG. 2, of distributing path performance metrics to enable selection of destination-oriented links along a selected path, according to an embodiment of the present invention.

FIG. 5 is a diagram illustrating the method in the network nodes of the DAG 12 of distributing path performance metrics for selection of destination-oriented links along a selected path, according to an embodiment of the present invention. The steps described in FIG. 5 can be implemented as executable code stored on a computer readable medium (e.g., a hard disk drive, a floppy drive, a random access memory, a read only memory, an EPROM, a compact disk, etc.).

The method begins in step 60, where the DAG destination 14 calculates and distributes the DAG topology 12 to the other nodes 16. Additional details related to creation of the DAG 12 are disclosed in the above-incorporated application Ser. Nos. 11/167,240 and 11/251,765.

The other nodes 16 store the appropriate paths for the DAG 12 in their DAG table 26 in step 62, providing each node 16 at least one path to the DAG destination 14. Once each node 16 has stored the at least one path in the DAG table 26, the node 16 can begin forwarding data packets to the DAG destination 14.

The DAG destination 14 begins monitoring link status of its source-connecting links A, B, and C, stores the link status results in its corresponding link status table 30, and periodically outputs in step 64 the path performance metrics P1, P2, P3 (containing only the initial link metrics PA, PB, and PC respectively) via the respective source-connecting links A, B, and C, resulting in the network nodes N3, N1, and N2 receiving the respective initial link metrics P1, P2, and P3. As described previously, each of the initial link metrics PA, PB, and PC specify the same DAG origin identifier (N0) and the same sequence number to identify a new "event" for refreshing the link metrics in the DAG 12. Each of the network nodes N3, N1, and N2 receiving the initial link metrics update the path performance metrics for the new "event" and distribute the updated path performance networks on their source-connecting links oriented away from the DAG destination 14.

Hence, the initial link metrics PA, PB, and PC output by the DAG destination (N0) 14 initiate a "cascade" of path performance metrics throughout the DAG 12.

The remainder of the steps in FIG. 5 will be described with respect to the network node N2 of FIG. 3 for simplicity, although it will be readily apparent that the steps described herein apply to each of the nodes 16.

The network interface 22 of the network node N2 16 receives in step 66 the path performance metrics for a given path via a destination-oriented link: as described previously, the network node N2 receives the path performance metrics P3 and P4 via the respective destination-oriented links C and D. In the case of the path performance metric P3, the link resource 28 stores the path performance metrics P3 either as a path metrics table entry 38*a* or a link state table entry 36*b*, depending on implementation; if both types of path performance metrics are used in the DAG 12, then since the path performance metric P3 specifies a single hop link metric, the link resource 28 may store the entries 38*a* and 36*b* as identical entries.

In the case of the path performance metric P4 received via the destination-oriented link D, the link resource 28 stores the path performance metric P4 as a path metric table entry 38b (assuming the metric P4 specifies the aggregate link metrics as a set 48 of accumulated link metrics), or as link state table entries 36a and 36d (based on the path performance metrics P4 being expressed as a collection of link metrics 44 specifying the same sequence number). As apparent from the foregoing, the network interface 22 may receive the path performance metrics P4 as individual messages, each message carrying a corresponding link state metric 44; hence, network interface 22 may receive the link state metrics PB and PD via the destination-oriented link D as separate messages, where the separate messages specifying the link state metrics PB and PD in combination constitute the path performance metric P4.

The link resource 28 determines in step 68 the connecting link metrics specified in the link status table 30 for each source-connecting link E and F. As described previously, the link resource 28 continually monitors the status of the source-connecting links E and F, and updates the link status table entries 31a and 31b accordingly. The link resource 28 aggregates the link metrics of the source-connecting links E and F with the received aggregate link metrics in step 70, and outputs the updated set of path performance metrics onto the appropriate source-connecting link, depending on implementation.

For example, in the case of link state type path performance metrics, the link resource 28 may simply repeat the received link metrics PB, BC, and PD on each of the source-connecting links E and F in step 72, and output also in step 72 link metrics PE onto the corresponding source-connecting link E, and output link metrics PF onto the corresponding source-connecting link F. Alternately, the link resource 28 may collect in step 70 all of the received link metrics, and append in step 70 the appropriate link metric; hence, the link resource 28 could output in step 72 the path performance metrics P5 and P6, as illustrated in FIG. 4A, as a single message specifying each of the link metrics for each hop in the path between the DAG destination 14 and the corresponding source-connecting link.

If the path performance metrics are implemented as accumulated link metrics as illustrated in the path metrics table 32a, the link resource 28 accumulates (i.e., cumulatively compares) in step 70 the connecting link metrics specified in the link status entries 31a and 31b with the accumulated metrics for the destination-oriented links as specified in the path metrics table entries 38a and 38b. The link resource 28 outputs the updated set of accumulated link metrics that describe a path between the DAG destination 14 and the corresponding source-connecting link, as illustrated as the path performance metrics P5 and P6 of FIG. 4B.

The link resource 28 repeats the process for each source-connecting link in step 74, such that each connected network node receives the appropriate updated metrics. As apparent from the foregoing, each next-hop node repeats the above-described process in step 76, enabling each network node 16 to identify the metrics for each path toward the DAG destination 14.

The link resource 28 in each network node therefore can utilize the stored path performance metrics in order to choose whether a given data packet should be forwarded over a given destination-oriented link in step 78. As apparent from the foregoing, the distribution of path performance metrics from the DAG destination 14 throughout the DAG 12 enables each of the network nodes 16 to continually assess the performance of a given path in reaching the DAG destination 14. Consequently, packets can be rerouted or distributed along various paths depending on the path performance metrics, and forwarding policies for given packets. For example, implementation of bandwidth reservation policies (e.g., according to RSVP protocol) enables packets identified as belonging to the reserved bandwidth to be forwarded along a path having the reserve bandwidth, whereas other packets that do not belong to the reserve bandwidth may be forwarded along different routes. Further, detected congestion conditions on various links may cause a redistribution of traffic flows, without the necessity of modifying the DAG 12.

According to the disclosed embodiment, network traffic is forwarded via multiple available paths to a DAG destination, based on partitioning the routing protocol that defines the DAG, from traffic forwarding protocols that utilize the DAG to choose forwarding paths based on detected link traffic conditions.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a network node, the method including:
receiving, via a first link of the network node, a first set of path performance metrics that identifies aggregate metrics for a corresponding path to a prescribed destination via the first link, the path performance metrics based on at least initial link metrics having been output by the prescribed destination onto a corresponding source-connecting link of the prescribed destination, the initial link metrics describing performance of the corresponding source-connecting link of the prescribed destination;
selectively determining second metrics for at least a second source-connecting link providing reachability by the network node to the prescribed destination for at least one connected network node; and
outputting, onto the second source-connecting link, an updated set of path performance metrics based on the first set of path performance metrics and the second metrics, the updated set of path performance metrics identifying the aggregate metrics for the corresponding path to the prescribed destination via the second source-connecting link and the first link;
wherein the prescribed destination is identified by the network node as a directed acyclic graph (DAG) destination and the first link is selected by the network node as a destination-oriented link that is directed toward the DAG destination.

2. The method of claim 1, further comprising:
second receiving, via a second link of the network node, a second set of path performance metrics that identifies the aggregate metrics for a corresponding path to the prescribed destination via the second link; and
selecting one of the first or second links, based on a comparison between the first and second set of path performance metrics.

3. The method of claim 2, further comprising second outputting a corresponding second updated set of path performance metrics based on the second set of path performance metrics and the second metrics, the second updated set of path performance metrics identifying the aggregate metrics for the corresponding path to the prescribed destination via the network node.

4. The method of claim 3, wherein:
the aggregate metrics for each of the first and second set of path performance metrics are specified as a corresponding plurality of link metrics for each hop in the corresponding path between the prescribed destination and the network node.

5. The method of claim 1, wherein the initial link metrics include at least one of bandwidth utilization, signal to noise ratio, signal strength, selected link speed, or bandwidth reservation level.

6. A network node comprising:
a network interface configured for receiving, via a first link, a first set of path performance metrics that identifies aggregate metrics for a corresponding path to a prescribed destination via the first link, the path performance metrics based on at least initial link metrics having been output by the prescribed destination onto a corresponding source-connecting link of the prescribed destination, the initial link metrics describing performance of the corresponding source-connecting link of the prescribed destination; and
a resource configured for:
selectively determining second metrics for at least a second source-connecting link providing reachability by the network node to the prescribed destination for at least one connected network node, and
outputting, onto the second source-connecting link having been established by the network interface with the connected network node, an updated set of path performance metrics based on the first set of path performance metrics and the second metrics, the updated set of path performance metrics identifying the aggregate metrics for the corresponding path to the prescribed destination via the second source-connecting link and the first link;
wherein the prescribed destination is identified by the network node as a directed acyclic graph (DAG) destination and the first link is selected by the network node as a destination-oriented link that is directed toward the DAG destination.

7. The network node of claim 6, wherein:
the network interface is configured for receiving, via a second link of the network node, a second set of path performance metrics that identifies the aggregate metrics for a corresponding path to the prescribed destination via the second link;
the resource configured for selecting one of the first or second links, based on a comparison between the first and second set of path performance metrics.

8. The network node of claim 7, wherein the resource is configured for outputting a corresponding second updated set of path performance metrics based on the second set of path performance metrics and the second metrics identifying the aggregate metrics for the corresponding path to the prescribed destination via the network node.

9. The network node of claim 8, wherein:
the aggregate metrics for each of the first and second set of path performance metrics are specified as a corresponding plurality of link metrics for each hop in the corresponding path between the destination and the network node.

10. The network node of claim 6, wherein the initial link metrics include at least one of bandwidth utilization, signal to noise ratio, signal strength, selected link speed, or bandwidth reservation level.

11. A non-transitory computer readable medium having stored thereon sequences of computer executable instructions for a network node to establish communications toward a prescribed destination, the sequences of computer executable instructions including instructions for:
receiving, via a first link of the network node, a first set of path performance metrics that identifies aggregate metrics for a corresponding path to the prescribed destination via the first link, the path performance metrics based on at least initial link metrics having been output by the prescribed destination onto a corresponding source-connecting link of the prescribed destination, the initial link metrics describing performance of the corresponding source-connecting link of the prescribed destination;
selectively determining second metrics for at least a second source-connecting link providing reachability by the network node to the prescribed destination for at least one connected network node; and
outputting, onto the second source-connecting link, an updated set of path performance metrics based on the first set of path performance metrics and the second metrics, the updated set of path performance metrics identifying the aggregate metrics for the corresponding path to the prescribed destination via the second source-connecting link and the first link;
wherein the prescribed destination is identified by the network node as a directed acyclic graph (DAG) destination and the first link is selected by the network node as a destination-oriented link that is directed toward the DAG destination.

12. The medium of claim 11, further comprising instructions for:
second receiving, via a second link of the network node, a second set of path performance metrics that identifies the aggregate metrics for a corresponding path to the destination via the second link; and
selecting one of the first or second links, based on a comparison between the first and second set of path performance metrics.

13. The medium of claim 12, further comprising instructions for second outputting a corresponding second updated set of path performance metrics based on the second set of path performance metrics and the second metrics, the second updated set of path performance metrics identifying the aggregate metrics for the corresponding path to the prescribed destination via the network node.

14. The medium of claim 13, wherein:
the aggregate metrics for each of the first and second set of path performance metrics are specified as a corresponding plurality of link metrics for each hop in the corresponding path between the prescribed destination and the network node.

15. The medium of claim 11, wherein the link metrics include at least one of bandwidth utilization, signal to noise ratio, signal strength, selected link speed, or bandwidth reservation level.

16. An ad hoc network comprising:
a plurality of network nodes, one of the network nodes identifiable as a prescribed destination having one or more source-connecting links enabling the other network nodes to reach the prescribed destination via paths, each of the other network nodes having at least one first link for reaching the prescribed destination, at least one of the other network nodes having a plurality of second source-connecting links connecting the one other network node to respective other ones of the other network nodes, each of the other network nodes comprising:
a network interface configured for receiving, via the corresponding first link, a first set of path performance metrics that identifies aggregate metrics for a corresponding path to the prescribed destination via the corresponding first link, the path performance metrics based on at least initial link metrics having been output by the destination onto the corresponding source-connecting link of the prescribed destination, the initial link metrics describing performance of the corresponding source-connecting link of the prescribed destination; and a resource configured for:

selectively determining second metrics for at least one of the second source-connecting links providing reachability by the corresponding other network node to the prescribed destination for at least one connected network node, and outputting, onto the least one of the second source-connecting links having been established by the network interface with the connected network node, an updated set of path performance metrics based on the first set of path performance metrics and the second metrics, the updated set of path performance metrics identifying the aggregate metrics for the corresponding path to the prescribed destination via the corresponding second source-connecting link and the first destination-oriented link, wherein the prescribed destination is identified by the corresponding other network node as a directed acyclic graph (DAG) destination and the first link is selected by the corresponding other network node as a destination-oriented link that is directed toward the DAG destination.

17. The network of claim 16, wherein:
the network interface is configured for receiving, via a second link of the corresponding other network node, a second set of path performance metrics that identifies the aggregate metrics for a corresponding path to the prescribed destination via the second link;
the resource configured for selecting one of the first or second links, based on a comparison between the first and second set of path performance metrics.

18. The network of claim 17, wherein the resource is configured for outputting a corresponding second updated set of path performance metrics based on the second set of path performance metrics and the second metrics identifying the aggregate metrics for the corresponding path to the prescribed destination via the corresponding other network node.

19. The network of claim 18, wherein:
the aggregate metrics for each of the first and second set of path performance metrics are specified as a corresponding plurality of link metrics for each hop in the corresponding path between the DAG destination and the corresponding network node.

20. The network of claim 16, wherein the initial link metrics include at least one of bandwidth utilization, signal to noise ratio, signal strength, selected link speed, or bandwidth reservation level.

* * * * *